(12) United States Patent
Lazzaro et al.

(10) Patent No.: US 7,525,042 B2
(45) Date of Patent: Apr. 28, 2009

(54) KIT FOR A COMBINATION OF PLUG DEVICES

(75) Inventors: Volker Lazzaro, Kirchhundem (DE); Helmut Eicher, Wenden (DE)

(73) Assignee: AMAD Mennekes Holding GmbH & Co. KG, Kirchhundem (DE)

( * ) Notice: Subject to any disclaimer, the term of this patent is extended or adjusted under 35 U.S.C. 154(b) by 617 days.

(21) Appl. No.: 10/547,882

(22) PCT Filed: Mar. 5, 2004

(86) PCT No.: PCT/EP2004/050261

§ 371 (c)(1),
(2), (4) Date: Sep. 1, 2005

(87) PCT Pub. No.: WO2004/082089

PCT Pub. Date: Sep. 23, 2004

(65) Prior Publication Data

US 2006/0070762 A1    Apr. 6, 2006

(30) Foreign Application Priority Data

Mar. 10, 2003    (DE) .............................. 103 10 630

(51) Int. Cl.
*H02G 3/08*    (2006.01)

(52) U.S. Cl. .............................. 174/50; 174/58; 174/64; 174/135; 220/4.02; 361/600; 439/535; 248/906

(58) Field of Classification Search ................... 174/50, 174/58, 64, 135, 53, 66, 67, 57, 60; 220/4.27, 220/4.02, 241, 242; 439/535; 248/906
See application file for complete search history.

(56) References Cited

U.S. PATENT DOCUMENTS

| 5,910,642 | A | 6/1999 | Daoud |
| 6,172,301 | B1 * | 1/2001 | Goodsell ...................... 174/66 |
| 6,321,925 | B1 * | 11/2001 | Crouse et al. .............. 220/4.27 |

FOREIGN PATENT DOCUMENTS

| CN | 2159622 | 3/1994 |
| CN | 1198266 | 11/1998 |
| DE | 43 11 348 A1 | 11/1993 |
| DE | 202 05 065 U | 8/2002 |
| DE | 102 06 063 A1 | 6/2003 |
| DE | 103 01 879 B3 | 4/2004 |
| EP | 0 448 545 A | 9/1991 |
| EP | 1 209 785 A | 5/2002 |
| WO | WO 97/12433 | 4/1997 |

* cited by examiner

*Primary Examiner*—Dhiru R Patel
(74) *Attorney, Agent, or Firm*—Henry M. Feiereisen; Ursula B. Day

(57) ABSTRACT

The invention relates to a kit for a combination of plug devices, including a lower housing parts (102), upper housing parts (202) and mounting plates (301, 302). The mounting plates (301, 302) can be selectively mounted in like mounting openings (214) of the upper housing parts (202) and configured to receive different types and numbers of plug devices. The mounting plates can also be configured as window elements.

20 Claims, 5 Drawing Sheets

KIT FOR A COMBINATION OF PLUG DEVICES

BACKGROUND OF THE INVENTION

The invention relates to a kit for a combination of plug devices. Known plug devices or receptacle combinations include a housing which has a topside provided with apertures for the installation of plug devices or receptacles and is intended for attachment to a wall for example. In the event, the housing accommodates automatic circuit breakers, an additional greater rectangular aperture is provided for installation of a swingable transparent window. Manufacture of such a combination of plug devices requires several steps, including injection molding of the plastic housing, molding-on of seals, cutting out openings for plug devices in the upper housing part, cutting out an opening for a window, preassembly of the window as well as final assemblage of the desired plug devices. All known steps must be executed, when intending to manufacture a particular combination (for example with a predefined number, arrangement and amperage of receptacles and/or fuses). Production on a small scale or change between different combinations is thus fairly cumbersome and accompanied by a long lead time.

SUMMARY OF THE INVENTION

Based on this background, it is an object of the present invention to provide means for more flexible and cost-efficient manufacture of combinations of plug devices.

According to one aspect of the invention, a kit for a combination of plug devices includes at least one of the following components:

a) a housing with at least one mounting opening. The housing may hereby be dimensioned as in conventional receptacle combinations and outfitted with means for securement to a wall, b) a mounting plate constructed for installation in the afore-stated mounting opening of the housing and in turn further constructed for allowing securement of at least one plug device (e.g. a plug or preferably a receptacle). Preferably, several like or different plug devices may be mounted to the mounting plate, thereby allowing an optimum space utilization.

c) A mounting plate configured as window module, wherein the window module is made at least partially of transparent material and intended for installation in the mounting opening of the housing.

With the aid of the described kit, different combinations of plug devices can be manufactured in very flexible manner and with less production costs and production lead. All desired combinations may use like base models of the housing in whose mounting opening(s) the mounting plates matching the desired plug devices are thus to be installed. The individual attachment of plug devices of different number, type and/or amperage requires thus only manufacture of mounting plates for the combinations involved and their storage. In the event, the housing has several mounting openings, numerous different combinations of plug devices can be made solely by various placement of the different mounting plates. A further important advantage of the kit is the inclusion of a particular mounting plate in the form of a window module. Thus, a window module, used for example as access to automatic circuit breakers, can be treated for installation purposes in a same way as the "normal" mounting plates with plug devices. Installation and arrangement of a window thus requires neither a particular configuration of the housing nor particular manufacturing steps. Rather, a window may be provided in any mounting opening in which plug devices may also be installed.

According to a preferred configuration of the window module, the latter has a frame for swingable attachment of a window sash by means of a hinge joint. The frame is then able to carry the fastening options provided for mounting plates so as to allow attachment to the housing in a same way as a "normal" mounting plate.

According to an optional further development of the window module, the frame and the window sash include cooperating locking elements which engage, when the window sash is closed and/or open, and thereby also stabilize the assumed position. In the open position of the window sash, devices that are located behind the window module can then be installed or operated, for example, in the absence of any interference by the window.

A second aspect of the invention relates to a further kit for a combination of plug devices, whereby this further kit may include optionally also features of the afore-described kit according to the first aspect of the invention. The further kit is characterized by at least the following components:

a) two housings of different design which are each provided with at least one identical mounting opening. The housings may have different dimensions to be able to receive a number of different or differently sized plug devices while requiring minimal space. The required likeness of the mounting openings in the various housings means that that they are identical especially as far as their installation-relevant dimensions and preferably also as far as the pertaining fastening means are concerned.

b) at least one mounting plate which is constructed for installation in the mentioned mounting openings of the housing, whereby at least one plug device can be mounted to the mounting plate. For reasons of space utilization, it is again preferred to be able to install several plug devices to the mounting plate.

As a consequence of a kit of the afore-defined type, very different combinations of plug devices, including few up to many plug devices, can be made in a simple and flexible manner with little production lead. The advantage of the kit is the ability to utilize the same mounting plates despite the use of different housing sizes since the mounting openings in the housings are of a same kind.

Preferably, the housing of the kit has the base configuration of a cuboid, with the edge length of at least one housing of the kit corresponding to the sum of the edge lengths of at least two other housings of the kit. This condition is met especially when at least one edge length of each housing of the kit can be expressed essentially as an integral multiple of a base length. The described size gradation of the cuboidal housing enables a space-saving, effective and optically pleasing side-by-side installation of several combinations of plug devices because of the capability to arrange them in a uniform grid. In particular, a single elongate housing may be flush-mounted as end next to two one or more shorter housings.

Optional further developments of both afore-defined variations of a kit will now be described in greater detail.

The kits include each mounting plates intended for the installation of plug devices. For this purpose, the mounting plates may include at least one aperture for the attachment of a plug device. Furthermore, the kits may also include closed or "blind" mounting plates substantially intended for closing a mounting opening of a housing in the absence of plug devices.

According to a further development of the kit, the mounting plates have one side provided with means for screwless attachment to the housing. In this way, the number of screws required for securement of a mounting plate can be reduced by half, saving time during assembly. The mentioned means may involve, e.g., a hinge by which the mounting plate may be swingably mounted to the housing. According to another configuration, the means include mounting plates having one side formed with projections for cooperation with complementary depressions at the mounting opening of the housing in order to anchor the mounting plate on one side in the housing. As an alternative, it is, of course, also possible to provide the mounting plate with depressions and to provide the complementary projections at the mounting opening. The provision of the projections and depressions realizes a hook mechanism which enables an installation of the mounting plate in an especially simple and rapid manner.

Further, a mounting plate can be secured in a mounting opening by providing holes (bores) with internal thread on at least one side of the mounting opening of the housing in alignment with corresponding through holes in the mounting plate, when the latter has been installed. The mounting plate may then be tightened with screws in the holes of the housing in a simple and reliable manner.

Optionally, the mounting plates may be constructed for a slanted installation of a plug device. In other words, the axis of the plug device installed in the mounting plate extends at an oblique angle (between 0° and 90°) in relation to the base plane of the mounting plate. For this purpose, the mounting plate may have overall an inclined inner surface or a collar with a border extending in an inclined plane.

The housing used in the kits is preferably made of multiple parts. In particular, it may have a upper housing part in which the mounting openings are provided, and a lower housing part, with the upper housing part being reversibly (i.e. detachably) connectable to the lower housing part. Such a two-part housing construction of bottom shell and top shell allows, e.g., a separate securement of the lower housing part to a wall and the pre-installation of electrical devices which then can be covered through attachment of the upper housing part.

Furthermore, the housing may also include two upper housing parts which can be secured to different sides of a preferably frame-shaped middle housing part. In this way, a combination of plug devices outfitted with plug devices can be realized on the front and back sides, suitable, for example, for a suspended assembly.

Sealing means are preferably provided between all interconnected parts of a combination of plug devices, especially between the parts plug device/mounting plate, mounting plate/housing, window sash/frame, upper housing part/lower housing part, and upper housing part/middle housing part, so that the combination is dust tight and water tight to conform to respective regulations.

BRIEF DESCRIPTION OF THE DRAWING

An example of the invention will now be described with reference to the Figures. It is shown in:

FIG. 3b a perspective view of a mounting plate, taken along the line IV-IV in FIG. 3a;

DETAILED DESCRIPTION OF PREFERRED EMBODIMENTS

Figure 1:
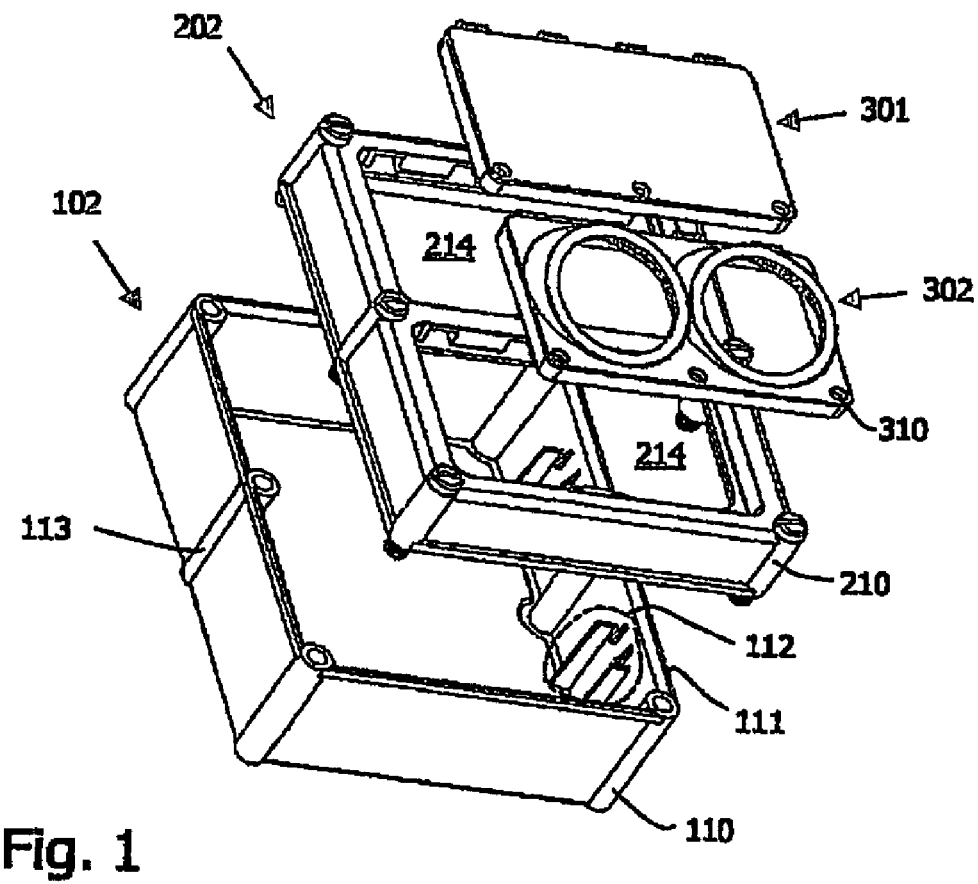
FIG. 1 an exploded view of a kit for a combination of plug devices.

FIG. 1 is an exploded illustration of components of a kit according to the invention for a combination of plug devices or receptacle combination according to the present invention. The kit includes a lower housing part 102, and upper housing part 202 as well as two mounting plates 301 and 302.

The lower housing part 102 has a substantially cuboidal configuration with open topside. Provided in the corner points of the lower housing part are integrally configured fastening sleeves 110 which have a topside provided with an internal thread. The fastening sleeves 110 are preferably continuously open on the inside and narrowed at the rear surface of the lower housing part 102 so that the lower housing part can be screwed to a wall by screws inserted in the fastening sleeves 110. The housing size as shown by way of example in FIG. 1 is further provided in the middle of the longer side of the lower housing part 102 with further fastening sleeves 113. Accommodated inside the lower housing part 102 are in known manner the desired electric installations. For this purpose, the inner wall of the lower housing part 102 has, for example, projections 112 for a snap-in mounting of standard hat rails.

The upper housing part 202 has also as base shape a cuboidal form with open bottom side and can be fittingly attached to the lower housing part 102. Both housing parts 202 and 102 are hereby interconnected by screws which extend through the fastening sleeves 210 of the upper housing part and engage the internal thread of the fastening sleeves 110, 113 of the lower housing part 102. Sealants are further provided between lower housing part 102 and upper housing part 202 to attain a dust-tight and water-tight connection of the housing parts. For example, the sealants may be injection-molded onto the upper rim of the lower housing part 102 in the form of a wrap-around seal 111 and/or molded-on as a two-component structure.

The upper housing part 202 has a topside provided with two substantially rectangular apertures 214 ("mounting openings") of same size in which the closed mounting plate 301 or the mounting plate 302 with two slanted collars can be inserted. The securement of the mounting plates will be described in more detail hereinafter.

Figure 2:
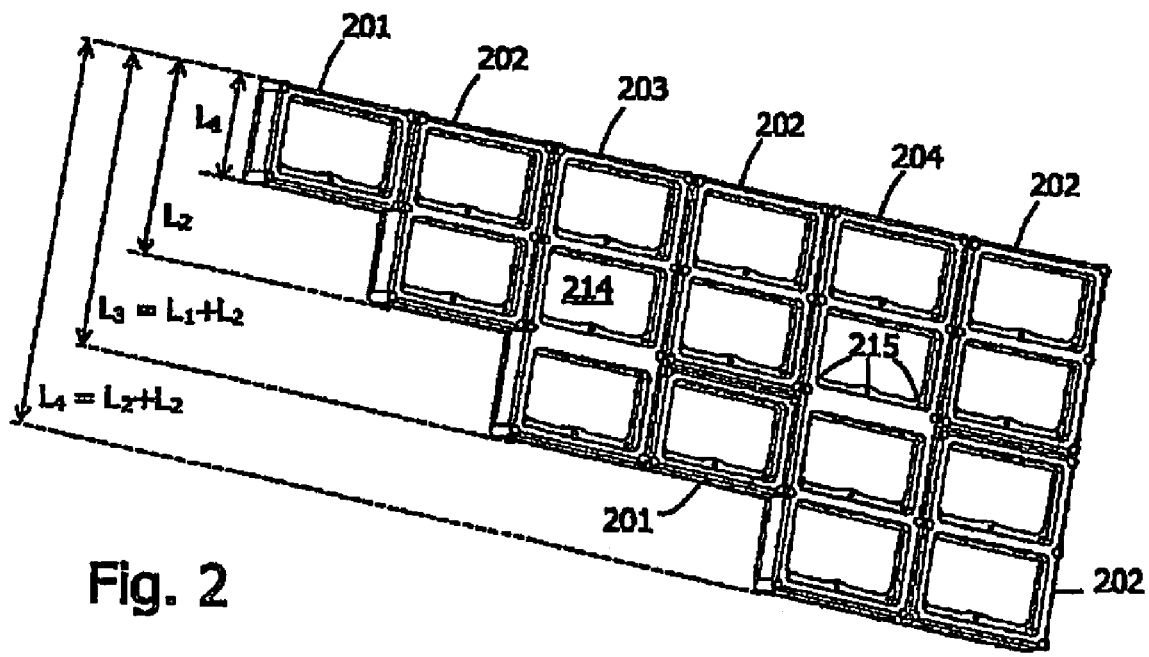
FIG. 2 a program of various upper housing parts with one to four mounting openings.

The components illustrated in FIG. 1 are only part of a more elaborate kit which contains virtually any combination of its components to realize a simple and flexible manufacture of combinations of plug devices of different type. In this context, FIG. 2 shows a preferred program of upper housing parts 201-204 with complementary lower housing parts (not shown). The stated program includes:

an upper housing part 201 with a mounting opening 214;

an upper housing part 202 with two mounting openings 214;

an upper housing part 203 with three mounting openings 214;

an upper housing part 204 with four mounting openings 214.

The dimensions of the various upper housing parts and the positioning of the fastening sleeves are hereby selected according to a certain grid pattern to allow joining of several small upper housing parts and to thereby realize an overall length which corresponds precisely to the total length of a respective greater upper housing part. In this way, the single upper housing part 201 (edge length $L_1$) and the dual upper housing part 202 (edge length $L_2$) can be adjoined in such a way as to have a total length $L_2+L_1$ which is equal to the edge length $L_3$ of the triple upper housing part 203, i.e. $L_3=L_2+L_1$. The corresponding fastening sleeves of the respective housings extend hereby in alignment. In similar manner, two dual upper housing parts 202 can be adjoined in such a way as to establish a total edge length equal to the edge length of quadruple housing 204: $L_4=L_2+L_2$.

Above grid configuration of the housing is attained in particular when one edge of this housing can be expressed as an integral multiple of a base length. For example, $L_1$ may be the base length and $L_2=2L_1$, $L_3=3L_1$, $L_4=4L_1$.

For reasons of space optimizing and maintaining existing standard sizes, a (slight) deviation from this strict grid pattern may occur so that $L_2=(2L_1-\Delta)$, wherein $\Delta$ may be greater or smaller than zero or equal zero. Still, a part grid pattern can be realized according to FIG. 2, when the length difference $\Delta$ exists also in the greater housing shapes 203, 204 once or a multiple in addition to the multiple of the base length $L_1$, e.g. $L_3=(3L_2+\Delta)$, $L_4=(4L_1-2\Delta)$.

The grid pattern of the housing sizes and sleeve positions simplifies assembly because the same fastening spots can be utilized, and in addition leads to an optically pleasing, harmonic look of several combinations mounted side-by-side.

Figure 3A:
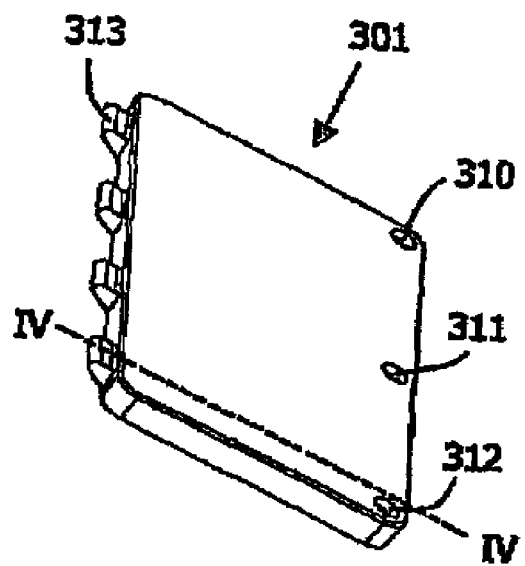
FIG. 3a a closed mounting plate.
Figure 3B:
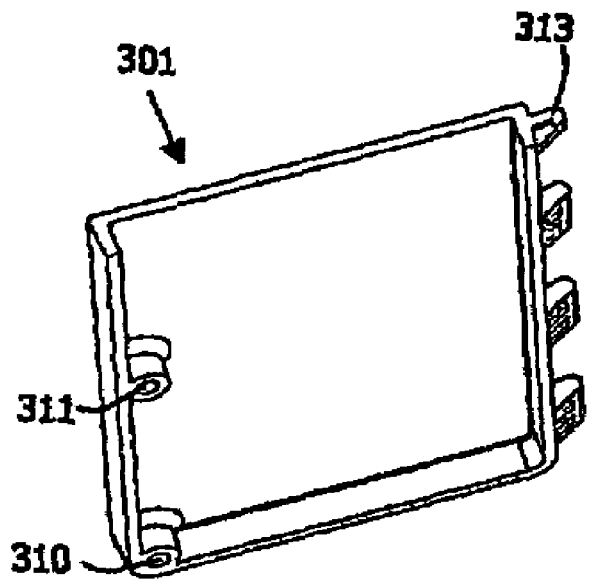

FIG. 3a shows a perspective view of a closed mounting plate 301. The latter may be used to close an idle mounting opening 214 of an upper housing part. FIG. 3b is a section along the line IV-IV through the mounting plate 301 of FIG. 3a. The mounting plate 301 includes a length side with three through openings 310, 311, and 312 which are aligned with respective holes 215 (FIG. 2) with internal thread in the upper housing parts 201, 202, 203, 204. Insertion of screws in the holes 310-312 thus allows attachment of the mounting plate 301 to an upper housing part. Preferably, the used screws are flush-mounted or countersunk in relation to the topside of the mounting plate 301 so as to be prevented from interfering with possible structures.

Formed on the side of the mounting plate 301 in opposition to the holes 310-312 are (four in the illustrated example) hooking projections 313. As can be seen from the section of FIG. 3b, these projections 313 are slightly inclined toward the topside of the mounting plate 301. The projections 313 can be inserted or hooked during assembly of the mounting plate 301 in or to corresponding pockets 231 (FIG. 8) at the rim of the mounting opening 214 of an upper housing part so as to realize a simplified quick assembly of the mounting plate. There is only need to tighten screws on one side of the mounting plate 301 in the holes 310-312. When the combination of plug devices is intended for attachment on a wall, the mounting plates are preferably mounted in such a way that the hooking projections 313 are situated on the upper side so that they are able to absorb the primary pull-out load.

Instead of the hooking projections 313, the use of a hinge mechanism may also be provided between mounting plate and upper housing part (not shown). Also in this way, assembly can be accelerated because compared to a screw connection all-around, half of the screws are now required to be tightened only.

Figure 4:
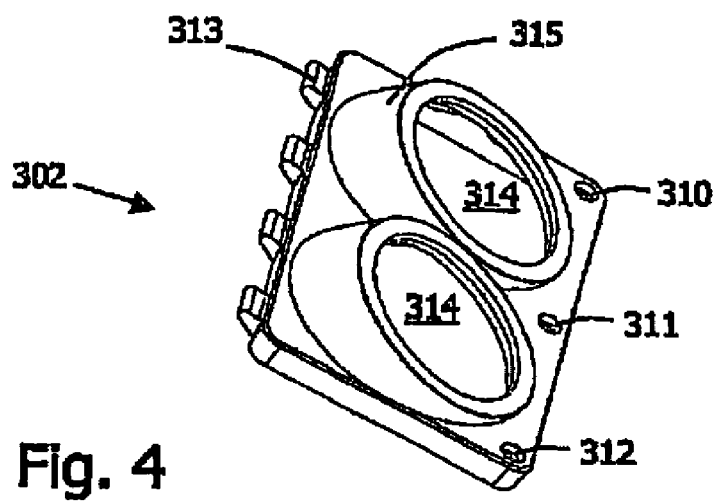
FIG. 4 a mounting plate with inclined collar-shaped structures for plug devices.

FIG. 4 shows a upper housing part 302 which is provided with two outwardly jutting inclined collars 315. Plug devices (not shown), such as for example receptacles, can be secured in both openings 314 of the collars. The plug devices may also be installed slantingly to the housing top surface in correspondence to the inclination of the collars 315 in the event the plug devices themselves are not configured for such an attachment. The mounting plate 302 again also includes hooking projections 313 as well as through openings 310-312 for a hooked or screwed assembly.

Figure 5:
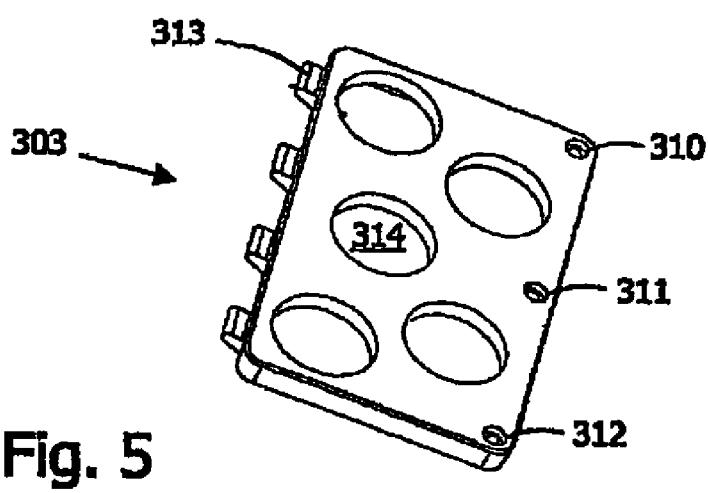
FIG. 5 a mounting plate with five apertures for plug devices.

FIG. 5 shows a further example of a planar mounting plate 303 which has five circular apertures 314 for the use of plug devices. This mounting plate 303, too, is provided with through openings 310-312 and hooking projections 313.

Figure 6:
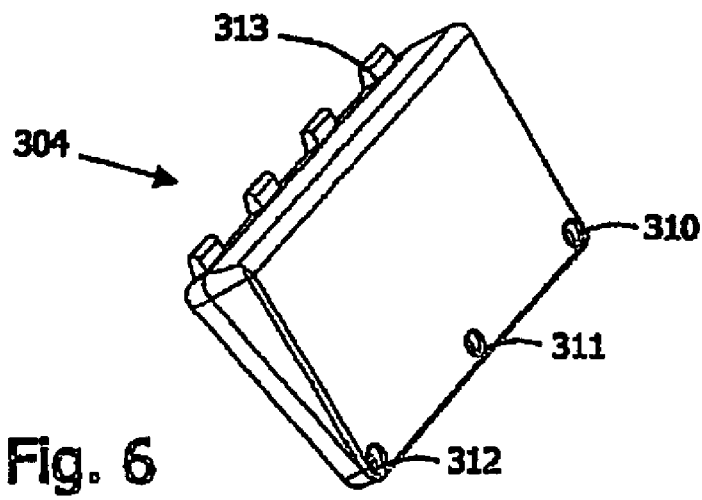
FIG. 6 a mounting plate with a inclined surface.

FIG. 6 shows a desk-like mounting plate 304 with an outwardly jutting slanted surface. The mounting plate 304 has the shape of a prism with triangular base configuration and an open underside. As an alternative, the inclined surface may also be deepened. Apertures (not shown) may be provided in the inclined surface for securement of plug devices which then assume a respective position in the final assembly state.

Installation of plug devices in the apertures 314 of the mounting plates 302, 303 may be realized, for example, by threadably engaging a coupling nut from the inside of the housing onto the body of the plug device (compare the application DE 102 06 063 "Anbau-Steckvorrichtung" [Attachable Plug Device], the content of which is fully incorporated in the present application). It is also possible to provide the rims of the apertures 314 with an internal thread for direct threaded engagement of a plug device element with a complementary external thread. Preferably, threads find application here which implement a stable and firm seat of the plug device element upon the mounting plate by less than one full turn (compare the application DE 103 01 879 "Steckvorrichtungselement with Montagegewinde" [Plug Device Element with Mounting Thread], the content of which is fully incorporated in the present application).

Apart from the examples shown in FIGS. 3 to 6, almost any further configurations of mounting plates can be used within the scope of the kit. For example, they may differ in relation to the number, position and size of the apertures for various plug devices. The use of different mounting plates in connection with the standardized upper housing parts and lower housing parts enable the provision of a broad program of combinations of plug devices in a simple and cost-efficient manner.

The flexibility of the kit can be further enhanced by mounting plates which are configured as window module. In this context reference is made to FIG. 7 which shows a particular configuration of a window module 305 having a frame 321 with attached transparent window sash 317. Like the "normal" mounting plates 301, 302, 303 of FIGS. 3 to 6, the frame 321 includes on one side through holes 311, 312 and on the opposite side hooking projections 313. The window module 305 can thus be installed in a same manner as the other mounting plates in the mounting opening 214 of an upper housing part.

Figure 7:
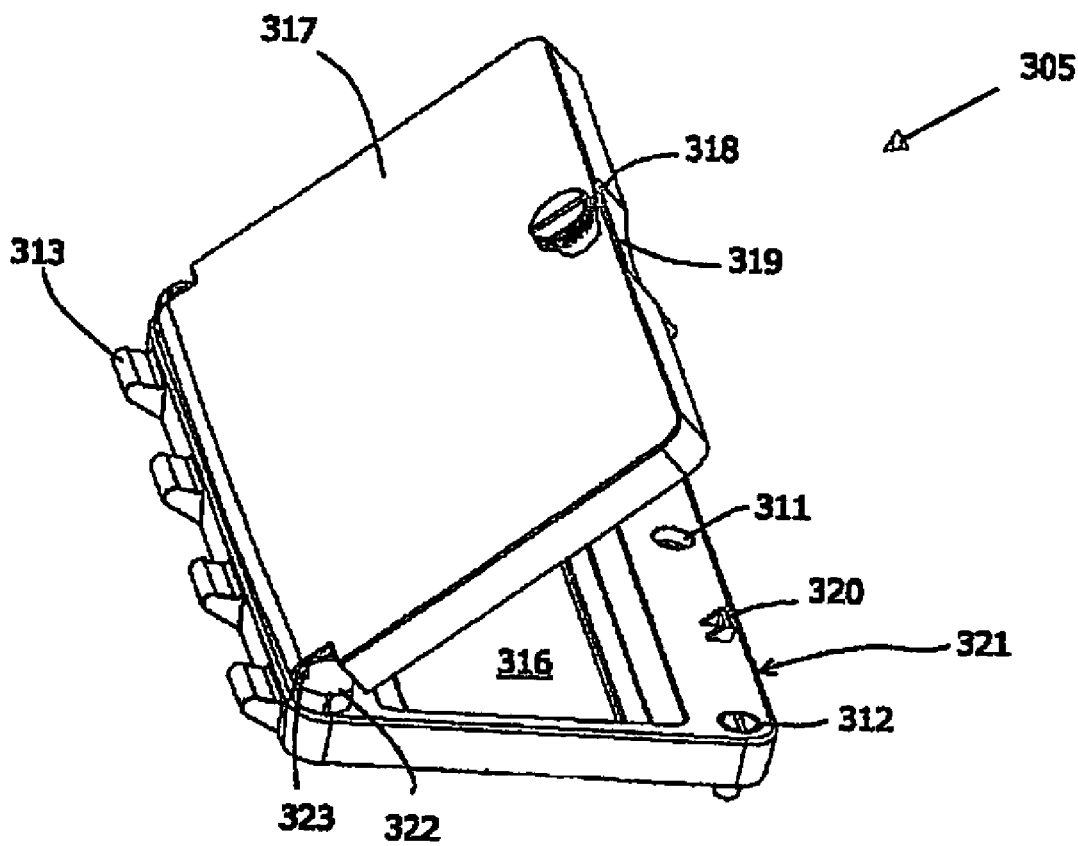
FIG. 7 a mounting plate configured as window module.

The frame 321 is further provided on two neighboring corners with two joint heads 322 in which the window sash 317 is swingably inserted by means of two pivot pins (not shown). The window sash 317 shown in FIG. 7 is open halfway. The joint heads 322 are further provided on their outer side with notches 323 in which a projection on the window sash 317 engages, when the pertaining opening or closing position is reached so that the window sash is locked in this position. As the locking mechanism is configured directly on the joint 322, only minimally interfering forces are caused for the "normal" swinging motion of the window sash 317.

Provided on the side of the frame 312 distal to the joint heads 322 are furthermore locking blocks 320 behind which respective locking lugs (not shown) of the window sash 317 engage, when the window sash is closed. A firm closure of the window sash 317 can further be realized by tightening a knurled screw 318 which preferably extends through the central through opening 311 of the window frame towards the threaded bore of the pertaining upper housing part (not shown) and at the same time effects a securement of the window sash 317 to the frame 321 and of the frame 321 to the upper housing part. The front side of the window sash 317 may further be provided with a recessed grip 319 to allow easier opening. Preferably provided between the window sash 317 and the window frame 321 are sealing elements (not shown).

As a consequence of the like manner of attachment of the window module 305 and the other mounting plates 301-303, it is possible to provide the upper housing parts 201-204 with only one type of mounting opening 214 because each mounting opening can be selectively used for the application of a window or plug devices. Provided between a mounting plate 301-305 and an upper housing part are preferably sealants like for example injection-molded or molded-on seals to insure a dust-tight and water-tight connection.

Figure 8:
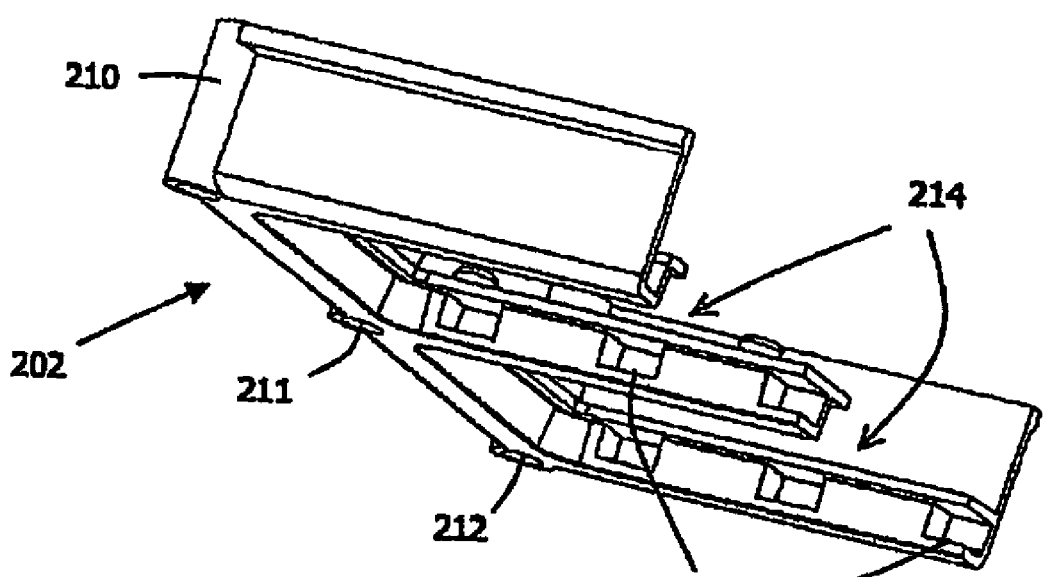
FIG. 8 a perspective view of a section through an upper housing part with two mounting openings.

FIG. 8 illustrates a perspective view of a section through an upper housing part 202 with two mounting openings 214. The provision of especially the four engagement pockets 213 on a side of each mounting opening 214 is hereby recognizable for insertion of the complementary hooking projections 313 of the mounting plates 301-305. The engagement pockets 213 are completely disposed in the housing interior below the rim of the mounting openings 214 so that the rim can be hermetically sealed to the outside from the top side by means of a wrap-around seal.

Figure 9:
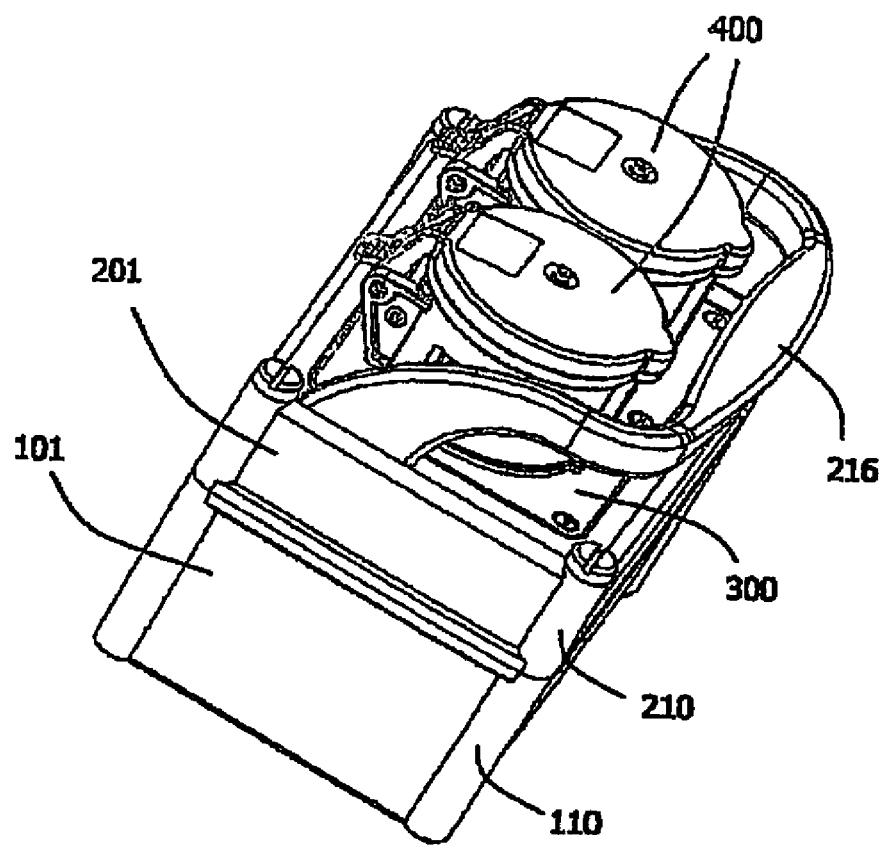
FIG. 9 an end assembly of a combination of plug devices with two receptacles and a handle.

FIG. 9 shows an example of an end assembly of a combination of plug devices with a lower housing part 101, a single upper housing part 201, and a mounting plate 300 to which two receptacles 400 are attached. Further recognizable is a handle or bracket 216 which is fastened to the upper housing part and providing i.a. impact protection for the device.

Figure 10:
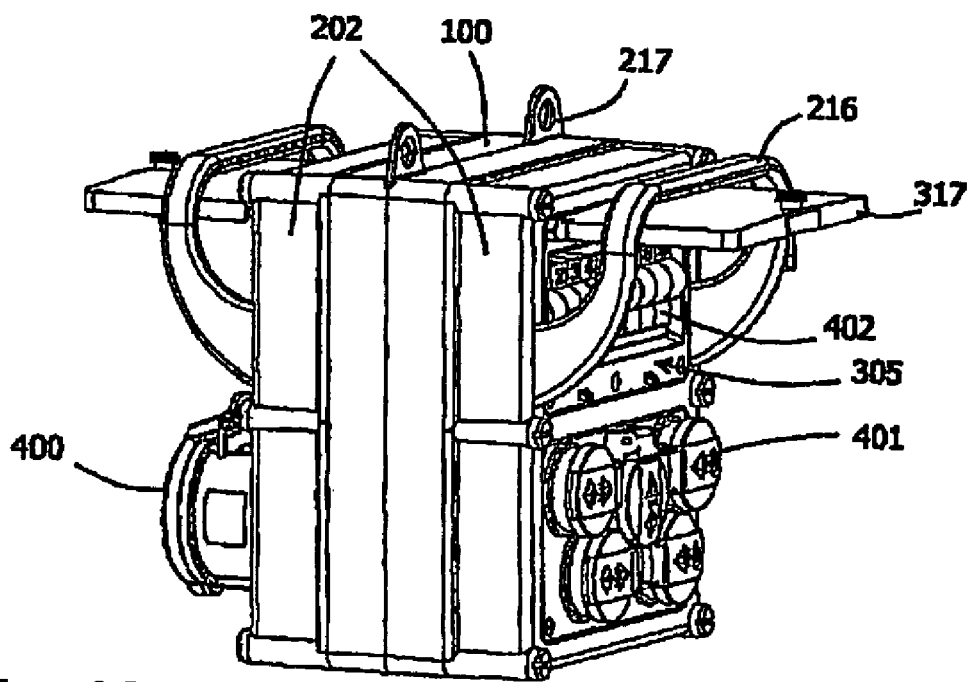
FIG. 10 an end assembly of a two-sided combination of plug devices for a suspended installation.

FIG. 10 shows a bilateral combination of plug devices which includes two dual upper housing parts 202 for accommodation of various receptacles 400, 401 as well as automatic circuit breakers 402. The automatic circuit breakers 402 are each located behind a window module 305. Further mounted to the upper housing parts are handles 216. The upper housing parts 202 are disposed back-to-back and connected to one another by a frame-shaped central housing part 100. The central housing part 100 has a topside formed with eyelets 217 for allowing suspended attachment of the combination of plug devices for example.

What is claimed is:

1. A kit for a combination of plug devices, comprising:
   a) a housing having a lower housing part and an upper housing part which is connectable to the lower housing part and is provided with at least one mounting opening;
   b) a first mounting plate having an aperture and constructed for installation in the mounting opening of the upper housing part, said first mounting plate intended for attachment of at least one plug device in the aperture and constructed to close the aperture with said plug device; and c) a second mounting plate configured as window module, wherein the window module is made at least partially of transparent material and intended for installation in the mounting opening of the upper housing part to close the mounting opening.

2. The kit of claim 1, wherein the window module has a frame for swingable arrangement of a window sash by means of a hinge joint.

3. The kit of claim 2 wherein the frame and the window sash include cooperating locking elements which lock, when the window sash is either closed or open.

4. The kit of claim 1, and further comprising fastening means for screwless attachment of either one of the first and second mounting plates to one side of the upper housing part.

5. The kit of claim 4, wherein the fastening means is constructed in the form of a hinge for swingably supporting one side of the either one of the mounting plates to the upper housing part.

6. The kit of claim 4, wherein the fastening means is constructed in the form of a tongue and groove joint, with the either one of the mounting plates including on one side one member selected from the group consisting of projection and depression, and with the upper housing part including on the one side another member of the group to complement the one member on the either one of the mounting plates.

7. The kit of claim 1, wherein the upper housing part has holes with internal thread on at least one side of the mounting opening in alignment with one of the through holes in either one of the mounting plates.

8. The kit of claim 1, wherein the first mounting plate is constructed for a slanted installation of the plug device.

9. The kit of claim 1, wherein the upper housing part and the lower housing part are reversibly interconnectable.

10. The kit of claim 1, wherein the housing includes two of said upper housing part and a central housing part, with the upper housing parts being securable to various sides of the central housing part.

11. A kit for a combination of plug devices, comprising:
    a) first and second housings of different configuration, each of the first and second housings having a lower housing part and an upper housing part which is connectable to the lower housing part and is provided with at least one mounting opening, wherein the mounting opening of the upper housing part of the first housing and the mounting opening of the upper housing part of the second housing are identical; and b) a mounting plate which is constructed for installation in either one of the mounting openings and has an aperture for attachment of a plug device, wherein the mounting plate is constructed to close the aperture with said plug device.

12. The kit of claim 11, wherein the first and second housings have a substantial cuboidal configuration, with at least one of the first and second housings defined by an edge length which corresponds to a sum of edge lengths of at least two further said housings.

13. The kit of claim 11, and further comprising fastening means for screwless attachment of the mounting plate to one side of either one of the upper housing parts.

14. The kit of claim 13, wherein the fastening means is constructed in the form of a hinge for swingably supporting one side of the mounting plate to the one upper housing part.

15. The kit of claim 13, wherein the fastening means is constructed in the form of a tongue and groove joint, with the mounting plate including on one side one member selected from the group consisting of projection and depression, and with the one upper housing part including on the one side another member of the group to complement the one member on the one mounting plate.

16. The kit of claim 11, wherein each of the first and second housings has holes with internal thread on at least one side of the mounting opening in alignment with one of the through holes in the mounting plate.

17. The kit of claim 11, wherein the mounting plate is constructed for a slanted installation of the plug device.

18. The kit of claim 11, wherein the upper housing part and the lower housing part are reversibly interconnectable.

19. The kit of claim 11, further comprising a central housing part sandwhich between two of said upper housing parts of either one of the first and second housings.

20. The kit of claim 11, further comprising a second mounting plate configured as window module, wherein the window module is made at least partially of transparent material and intended for installation in either one of the mounting openings.

* * * * *